(12) United States Patent
Miralles et al.

(10) Patent No.: US 10,124,909 B2
(45) Date of Patent: Nov. 13, 2018

(54) SYSTEMS AND DEVICES FOR REMOTELY OPERATED UNMANNED AERIAL VEHICLE REPORT-SUPPRESSING LAUNCHER WITH PORTABLE RF TRANSPARENT LAUNCH TUBE

(71) Applicant: AEROVIRONMENT, INC., Monrovia, CA (US)

(72) Inventors: Carlos Thomas Miralles, Burbank, CA (US); Guan H Su, Rowland Heights, CA (US); Alexander Andryukov, Simi Valley, CA (US); John McNeil, Tujunga, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 136 days.

(21) Appl. No.: 14/887,675

(22) Filed: Oct. 20, 2015

(65) Prior Publication Data

US 2016/0039536 A1    Feb. 11, 2016

Related U.S. Application Data

(63) Continuation of application No. 13/234,044, filed on Sep. 15, 2011, now Pat. No. 9,187,184, which is a
(Continued)

(51) Int. Cl.
*B64F 1/04*    (2006.01)
*B64C 39/02*    (2006.01)
(Continued)

(52) U.S. Cl.
CPC .............. *B64F 1/04* (2013.01); *B64C 39/024* (2013.01); *B64F 1/06* (2013.01); *F41A 21/02* (2013.01);
(Continued)

(58) Field of Classification Search
CPC ........ F41F 1/00; F41F 3/04; B64F 1/04; B64F 1/06; B64C 39/024
(Continued)

(56) References Cited

U.S. PATENT DOCUMENTS 2,792,962 A    5/1957  Granfelt
3,107,616 A    10/1963 Boaz et al.
(Continued)

FOREIGN PATENT DOCUMENTS

CN    2769834 Y    4/2006
CN    101249891 A    8/2008
(Continued)

OTHER PUBLICATIONS

Supplementary EP Search Report for EP Serial No. EP10833731 completed Nov. 4, 2014.
(Continued)

*Primary Examiner* — Justin M Benedik
(74) *Attorney, Agent, or Firm* — Brooks Acordia IP Law, PC; Pejman Yedidsion; Eric Aagaard

(57) ABSTRACT

An unmanned aerial vehicle (UAV) launch tube (100) that comprises at least one inner layer of prepreg substrate (370) disposed about a right parallelepiped aperture (305), at least one outer layer of prepreg substrate (380) disposed about the right parallelepiped aperture, and one or more structural panels (341-344) disposed between the at least one inner layer of prepreg substrate (340) and the at least one outer layer of prepreg substrate (380). An unmanned aerial vehicle (UAV) launch tube (100) that comprises a tethered sabot (700,740) configured to engage a UAV within a launcher volume defined by an inner wall, the tethered sabot (700, 740) dimensioned to provide a pressure seal at the inner wall and tethered to the inner wall, and wherein the tethered sabot (700,740) is hollow having an open end oriented toward a
(Continued)

high pressure volume and a tether (740) attached within a hollow (910) of the sabot (700) and attached to the inner wall retaining the high pressure volume or attach to the inner base wall (1013). A system comprising a communication node (1500-1505) and a launcher (1520) comprising an unmanned aerial vehicle (UAV) in a pre-launch state configured to receive and respond to command inputs from the communication node (1500-1505).

20 Claims, 11 Drawing Sheets

Related U.S. Application Data continuation of application No. 13/229,377, filed on Sep. 9, 2011, now Pat. No. 8,505,430, which is a continuation of application No. PCT/US2010/048313, filed on Sep. 9, 2010.

(60) Provisional application No. 61/241,001, filed on Sep. 9, 2009, provisional application No. 61/240,987, filed on Sep. 9, 2009, provisional application No. 61/240,996, filed on Sep. 9, 2009.

(51) Int. Cl.
| | |
|---|---|
| *B64F 1/06* | (2006.01) |
| *F41A 21/02* | (2006.01) |
| *F41F 3/042* | (2006.01) |
| *F42B 39/14* | (2006.01) |
| *F41F 1/00* | (2006.01) |

(52) U.S. Cl.
CPC ............. *F41F 1/00* (2013.01); *F41F 3/042* (2013.01); *F42B 39/14* (2013.01); *B64C 2201/08* (2013.01); *B64C 2201/102* (2013.01); *B64C 2201/146* (2013.01); *B64C 2201/201* (2013.01)

(58) Field of Classification Search
USPC .............. 89/1.13, 1.14; 244/49, 62, 63
See application file for complete search history.

(56) References Cited

U.S. PATENT DOCUMENTS

| | | | | |
|---|---|---|---|---|
| 3,107,617 | A | | 10/1963 | Loeper et al. |
| 3,306,163 | A | | 2/1967 | Griessen |
| 3,724,319 | A | * | 4/1973 | Zabelka ................ F42B 12/68 102/403 |
| 3,808,940 | A | * | 5/1974 | Schillreff ............... F41A 19/58 89/1.1 |
| 3,939,967 | A | * | 2/1976 | Tenney ................. B65D 81/02 206/3 |
| 4,209,147 | A | | 6/1980 | Jones |
| 4,301,708 | A | * | 11/1981 | Mussey .................. F41F 3/077 89/1.81 |
| 4,410,151 | A | * | 10/1983 | Hoppner ............... B64C 39/024 244/120 |
| 4,776,255 | A | * | 10/1988 | Smith .................... F41H 11/14 89/1.11 |
| D317,003 | S | | 5/1991 | Tribe et al. |
| 5,115,711 | A | * | 5/1992 | Bushagour ............. F41F 3/042 89/1.816 |
| 5,193,517 | A | | 3/1993 | Taylor et al. |
| 5,303,695 | A | | 4/1994 | Shopsowitz |
| 5,322,243 | A | | 7/1994 | Stoy |
| 5,417,139 | A | * | 5/1995 | Boggs ................... F41H 11/14 102/504 |
| 5,458,042 | A | * | 10/1995 | Cante .................... F24B 39/00 89/1.813 |
| 5,582,364 | A | | 12/1996 | Trulin et al. |
| 5,695,153 | A | * | 12/1997 | Britton .................. B64F 1/04 124/63 |
| 5,780,766 | A | | 7/1998 | Schroppel |
| 5,819,717 | A | | 10/1998 | Johnson et al. |
| 5,833,782 | A | | 11/1998 | Crane et al. |
| 5,927,648 | A | | 7/1999 | Woodland |
| 5,933,263 | A | * | 8/1999 | Kinstler ................ H04B 10/11 102/207 |
| 5,965,836 | A | * | 10/1999 | Rakov .................... F42B 15/00 102/374 |
| D417,639 | S | | 12/1999 | Carichner et al. |
| 6,056,237 | A | | 5/2000 | Woodland |
| 6,354,182 | B1 | * | 3/2002 | Milanovich ............. F41F 3/04 124/17 |
| 6,371,002 | B1 | | 4/2002 | MacLeod |
| D461,159 | S | | 8/2002 | Miralles |
| 6,496,151 | B1 | | 12/2002 | Ferreri et al. |
| 6,568,309 | B2 | | 5/2003 | MacLeod |
| 6,601,795 | B1 | | 8/2003 | Chen |
| 6,851,347 | B1 | * | 2/2005 | Plunkett ................ F41F 3/07 89/1.806 |
| 6,851,647 | B1 | * | 2/2005 | Rosenbaum ............ B64F 1/06 244/63 |
| 6,967,614 | B1 | * | 11/2005 | Wardell ................. F42C 15/40 342/13 |
| 6,978,970 | B2 | | 12/2005 | Purcell |
| 7,207,254 | B2 | * | 4/2007 | Veitch .................. F41F 3/04 89/1.807 |
| 7,338,010 | B2 | | 3/2008 | Corder et al. |
| 7,398,721 | B1 | * | 7/2008 | Alberding ............. F41B 11/00 89/1.806 |
| 7,484,450 | B2 | * | 2/2009 | Hunn ..................... F41F 3/04 124/61 |
| 7,520,204 | B2 | * | 4/2009 | Williams .............. F41F 3/077 220/200 |
| 7,584,925 | B2 | | 9/2009 | Miller et al. |
| 7,793,606 | B2 | | 9/2010 | Olivier et al. |
| 7,816,635 | B2 | | 10/2010 | Fink |
| 8,056,480 | B2 | | 11/2011 | Brydges-Price |
| 8,089,034 | B2 | | 1/2012 | Hammerquist |
| 8,444,082 | B1 | | 5/2013 | Foch |
| 8,985,504 | B2 | | 3/2015 | Tao et al. |
| 2003/0094536 | A1 | | 5/2003 | LaBiche |
| 2004/0194614 | A1 | | 10/2004 | Wang |
| 2005/0274845 | A1 | * | 12/2005 | Miller ................... B64C 39/024 244/49 |
| 2006/0086241 | A1 | * | 4/2006 | Miller ................... F41A 23/42 89/1.802 |
| 2007/0152098 | A1 | | 7/2007 | Sheahan, Jr. et al. |
| 2007/0158911 | A1 | * | 7/2007 | Torre .................... A63F 9/0252 273/317 |
| 2008/0148927 | A1 | | 6/2008 | Alberding et al. |
| 2009/0007765 | A1 | | 1/2009 | Hunn et al. |
| 2009/0134273 | A1 | | 5/2009 | Page et al. |
| 2009/0193996 | A1 | | 8/2009 | Brydges-Price |
| 2010/0281745 | A1 | * | 11/2010 | Condon .................. F41F 3/04 42/90 |
| 2011/0057070 | A1 | * | 3/2011 | Lance ................... F41F 1/00 244/3.12 |
| 2012/0205488 | A1 | | 8/2012 | Powell et al. |
| 2015/0008280 | A1 | | 1/2015 | Smoker |
| 2015/0053193 | A1 | | 2/2015 | Pruett et al. |

FOREIGN PATENT DOCUMENTS

| | | |
|---|---|---|
| CN | 101473184 A | 7/2009 |
| DE | 3048598 A1 | 7/1982 |
| GB | 2188713 | 10/1987 |
| GB | 2188713 A | 10/1987 |
| JP | 02-291703 | 12/1990 |
| JP | 05-106997 | 4/1993 |
| JP | 05-149696 | 6/1993 |
| JP | 2003-177000 | 6/2003 |
| JP | 2004-271216 | 9/2004 |
| JP | 2005-500774 | 1/2005 |
| JP | 2005-240841 | 9/2005 |
| JP | 2007-228065 | 9/2007 |

(56) References Cited

FOREIGN PATENT DOCUMENTS

| WO | 9712195 | 4/1997 |
|---|---|---|
| WO | 03/017419 | 2/2003 |
| WO | 2005001372 A2 | 1/2005 |
| WO | 2005/023642 A2 | 3/2005 |

OTHER PUBLICATIONS

Aerovironment, Inc. et al., International Search Report for Serial No. PCT/US2010/048313 dated May 26, 2011.
Final Office action for U.S. Appl. No. 13/229,377 dated Dec. 18, 2012.
Notice of of Allowance for U.S. Appl. No. 13/229,377 dated Apr. 8, 2013.
Non-Final Office action for U.S. Appl. No. 13/229,377 dated Aug. 7, 2012.
Final Office action for U.S. Appl. No. 13/234,044 dated Oct. 23, 2013.
Non-Final Office action for U.S. Appl. No. 13/234,044 dated Mar. 1, 2013.
Notice of of Allowance for U.S. Appl. No. 13/234,044 dated Jul. 14, 2015.
Non-Final Office action for U.S. Appl. No. 13/234,044 dated Feb. 11, 2015.
Final Office action for U.S. Appl. No. 13/234,044 dated Aug. 13, 2014.
Non-Final Office action for U.S. Appl. No. 13/234,044 dated Mar. 11, 2014.
European Search Report for Serial No. EP161799150 dated Jan. 17, 2017.
Chinese Office action for Serial No. 2016105663397 dated Oct. 21, 2017.
Andreas Parsch; Coyote; Advanced Ceramics Research; 2006; . (Year: 2006).
BusinessWire; First Test Flight of Coyote Unmanned Aircraft System; Jan. 19, 2010; YouTube; ,https://www.youtube.com/watch?v=0MmdHLRxIN4>. (Year: 2010).

* cited by examiner

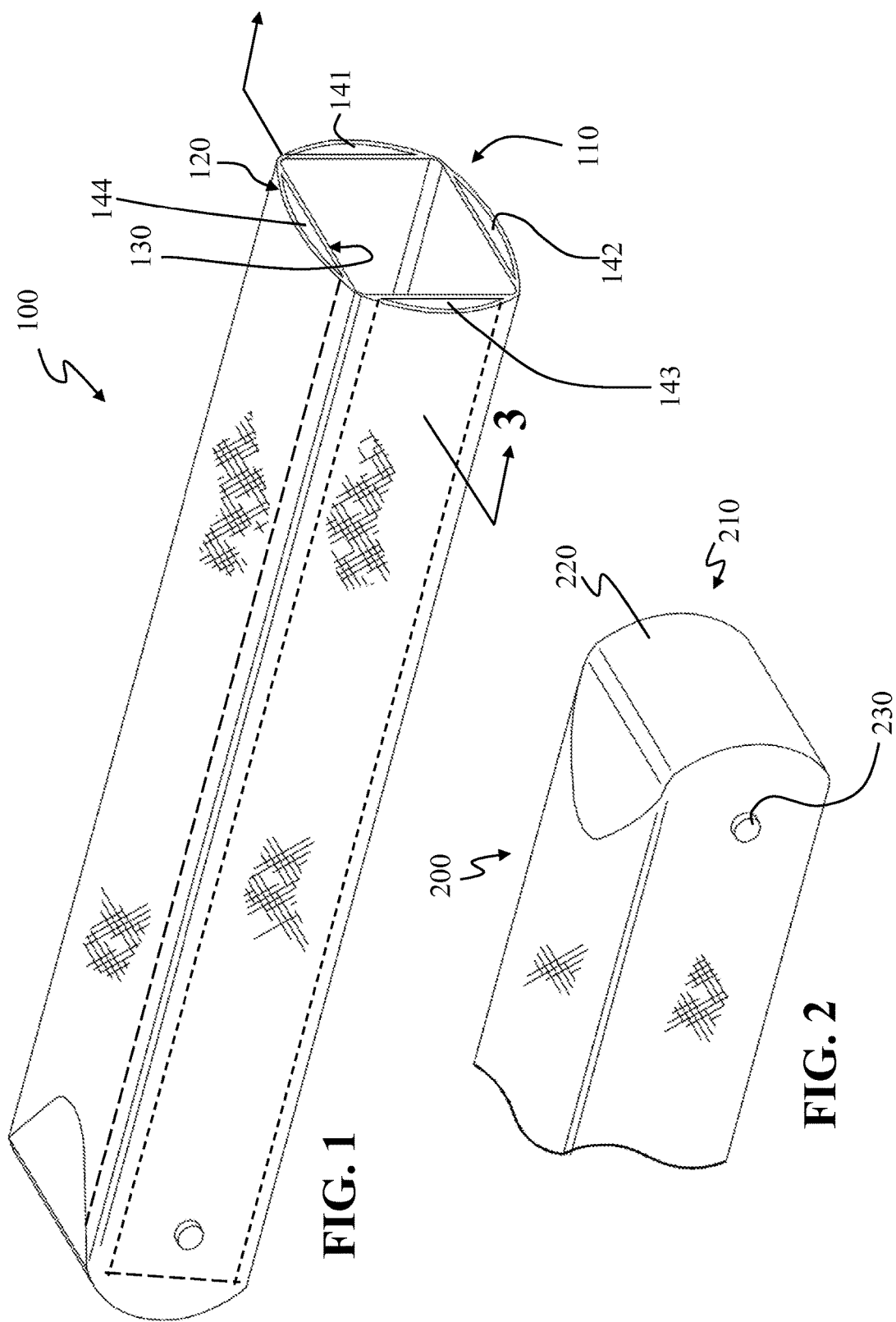

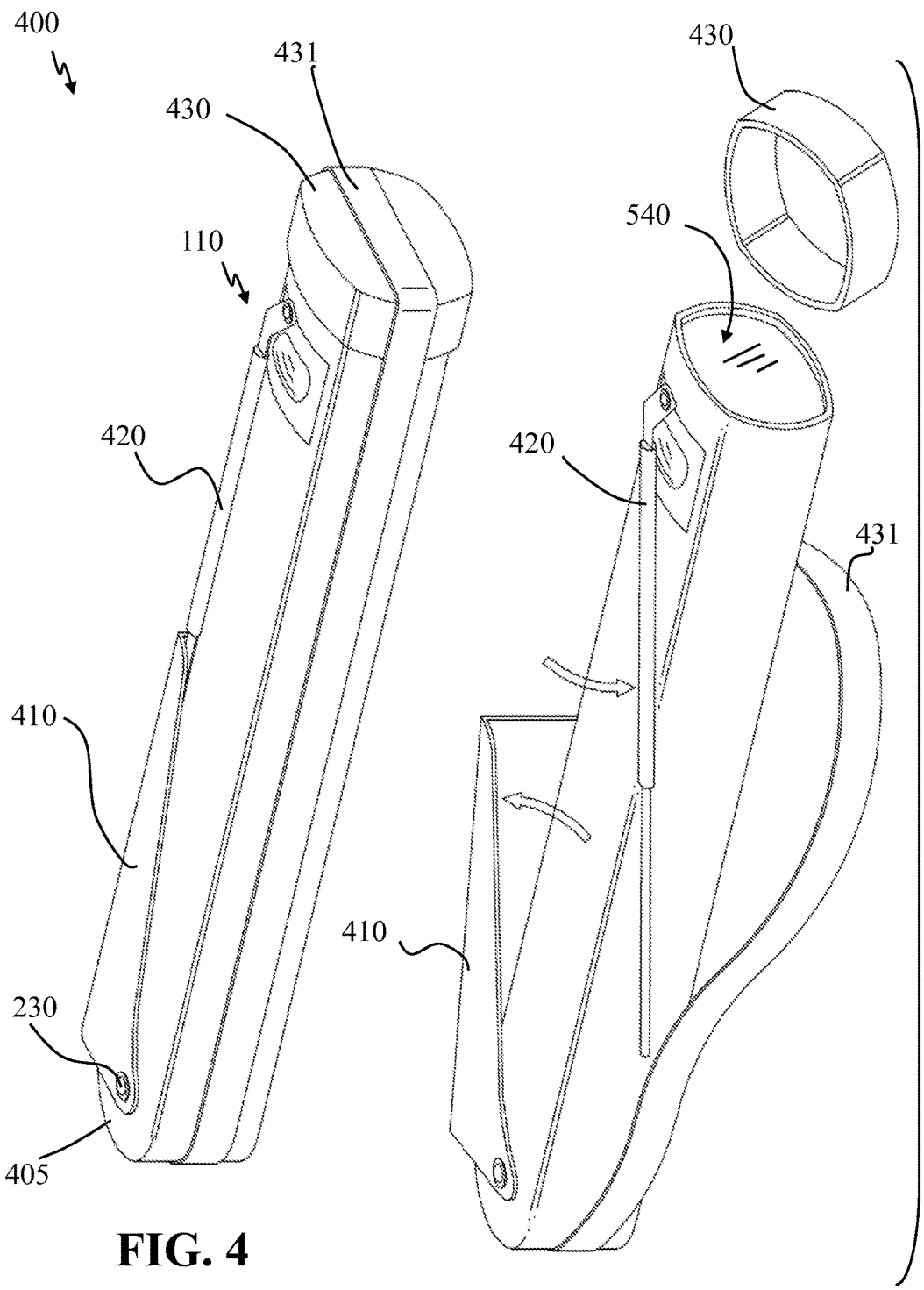

SYSTEMS AND DEVICES FOR REMOTELY OPERATED UNMANNED AERIAL VEHICLE REPORT-SUPPRESSING LAUNCHER WITH PORTABLE RF TRANSPARENT LAUNCH TUBE

CROSS-REFERENCE TO RELATED APPLICATIONS

This application is a continuation of patent application Ser. No. 13/234,044, filed Sep. 15, 2011, which is a continuation of patent application Ser. No. 13/229,377, filed Sep. 9, 2011, and is a continuation of International Application No. PCT/US2010/48313, filed Sep. 9, 2010, which claims priority to and the benefit of U.S. Provisional patent application Ser. No. 61/240,996 filed Sep. 9, 2009, U.S. Provisional patent application Ser. No. 61/240,987 filed Sep. 9, 2009, and U.S. Provisional patent application Ser. No. 61/241,001 filed Sep. 9, 2009, all of which are hereby incorporated herein by reference in their entirety for all purposes.

TECHNICAL FIELD

Embodiments include launch tubes and canisters, report-suppressing launch tubes, and sabots for an unmanned aerial vehicle (UAV). Embodiments also pertain to systems comprising one or more UAVs, and to a system comprising a command node and a launcher containing a UAV in a pre-launch state configured to receive command signals from the command node.

BACKGROUND

Typically UAVs are shipped to a launch site in an unassembled state. At the site they are assembled, tested, and then launched. Launching is typically executed by hand, by an elastic tether, a powered wench, from a moving vehicle, or some combination thereof. Such methods can be time consuming and/or cumbersome. Once launched, a UAV may receive uplinks and may be guided by a human-in-the-loop, a human intermittently up-linking course corrections, e.g., via supervisory control, or by a preloaded intercept/strike point in combination with an onboard flight path guidance generator and outputs of inertial sensors and/or from a Global Positioning System (GPS) receiver.

SUMMARY

Embodiments may include articles such as an unmanned aerial vehicle (UAV) launch tube comprising: (a) at least one inner layer of prepreg substrate disposed about a right parallelepiped aperture; (b) at least one outer layer of prepreg substrate disposed about the right parallelepiped aperture; and (c) one or more structural panels disposed between the at least one inner layer of prepreg substrate and the at least one outer layer of prepreg substrate. The at least one inner layer of prepreg substrate may comprise epoxy prepreg Kevlar™ or other light weight composites. The at least one outer layer of prepreg substrate may comprise epoxy prepreg Kevlar™ or other light weight composites. The one or more structural panels may comprise balsawood or a light weight composite. In some embodiments, the one or more structural panels may comprise four structural panels, where each panel comprises a cylindrical segment, and each panel has a planar surface defined by a chord length and a cylindrical height. Each proximate planar surface may be disposed orthogonally relative to one another, each structural panel having a first lateral edge and a second lateral edge perpendicular to the chord length, where the first lateral edge of a first structural panel is proximate to, but not contacting, a first lateral edge of a second structural panel. The second lateral edge of the first structural panel may be proximate to, but not contacting, a first lateral edge of a third structural panel. The first lateral edge of a fourth structural panel may be proximate to, but not contacting, a second lateral edge of a second structural panel. The second lateral edge of the fourth structural panel may be proximate to, but not contacting, a second lateral edge of a third structural panel, where the planar surfaces of each of the four structural panels may be aligned with a launch tube centerline. In addition, each of the four structural panels may be disposed between the inner layer of epoxy prepreg substrate and the outer layer of epoxy prepreg substrate. Embodiments include articles such as an unmanned aerial vehicle (UAV) launch tube configured for report suppression comprising a structural element configured to engage the UAV within a launcher volume defined by an inner wall. The article may be dimensioned to provide a pressure seal at the inner wall and tethered to the inner wall. The structural element may have a hollow, or cavity, having an open end oriented toward a high pressure volume and a tether attached within a hollow or cavity of the article and may be attached to the inner wall retaining the high pressure volume.

Additional embodiments may include methods and UAV systems comprising: (a) a communications node; and (b) a launcher comprising a UAV configured to receive, in a pre-launch state, command inputs from the communications node. In some embodiments, the UAV in a pre-launch state is further configured to transmit to a communications node UAV status data responsive to a received query signal. In some embodiments, the RF antenna of the UAV is contained within the launcher volume. In some embodiments, the launch propulsion system is configured to receive RF signals.

BRIEF DESCRIPTION OF THE DRAWINGS

Embodiments are illustrated by way of example and not limitation in the figures of the accompanying drawings, and in which:

FIG. 1 is a top-side perspective view of an exemplary launch tube embodiment;

FIG. 2 is a bottom-side perspective view of a portion of an exemplary launch tube embodiment;

FIG. 4 is an exemplary depiction of a launch tube configured as a UAV carrying case embodiment of the present invention;

FIG. 5 is an exemplary depiction of a launch tube configured as a UAV carrying case embodiment of the present invention;

DETAILED DESCRIPTION

Figure 3:
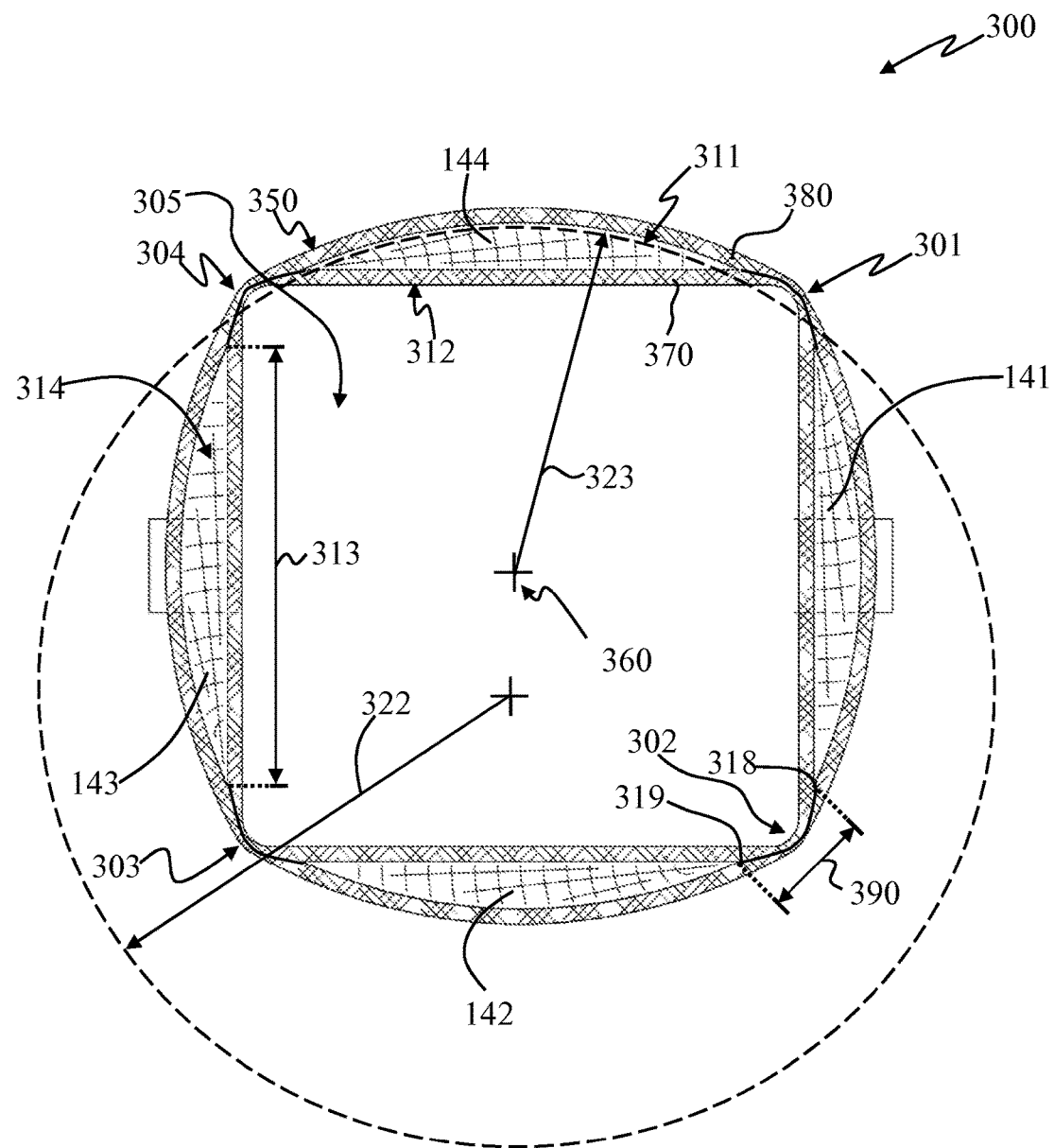
FIG. 3 is cross-sectional view of an exemplary launch tube embodiment.

FIG. 1 is a top-side perspective view of an exemplary launch tube 100 embodiment. The top, or open end 110, of the exemplary launch tube presents a square-shaped aperture having rounded corners. Disposed between an outer layer of prepreg substrate 120 and an inner layer of prepreg substrate 130 are four structural panels 141-144.

FIG. 2 is a bottom-side perspective view of a portion of an exemplary launch tube embodiment 200. The bottom, or closed end 210, of the exemplary launch tube presents an end 220 curved about an axis collinear with a first footing pivot point protrusion 230 where a second footing pivot point protrusion is opposite the first footing pivot point protrusion 230, but not shown in the figure.

FIG. 3 is a cross-sectional view 300 of the exemplary launch tube embodiment of FIG. 1 showing four structural panels 141-144 disposed about a launch tube centerline. A non-cylindrical UAV may be placed and launched from such a volume. Each panel is shown having an outer surface curvature 311 representative of a radius of curvature 322 greater than the distance 323 from the outer surface 350 to the launch tube centerline 360. Each panel 141-144 is shown having a planar inner surface 312 representative of a chord length 313. Accordingly, an end face 314 of each panel 141-144 in the present cross-sectional view is a circular segment. Each panel is shown disposed between an inner layer of prepreg substrate 370 and an outer layer of prepreg substrate 380. The panels are shown disposed apart from one another, with there being space 390 between the lateral edges 318, 319 of the panels. Accordingly, the inner layer of prepreg substrate 370 and the outer layer of prepreg substrate 380 contact one another at the corners 301-304 of the right parallelepiped-shaped volume 305. The outer layer of prepreg substrate 380 defines in cross-sectional view, a substantially ovoid-shaped outside perimeter. In some embodiments the inner layer 370 and outer layer 380 may comprise epoxy prepreg Kevlar™ or a composite material, or combinations of both, and the structural panels may comprise balsawood or a light weight composite material, or combination of both.

FIG. 4 is an exemplary depiction of a launch tube configured as a UAV carrying case 400 embodiment. A footing 410 is shown rotatably attached to the launch tube 405 via a footing pivot point protrusion 230. A first strut or leg 420 is shown rotatably attached to the launch tube 405 proximate to the top 110 of the launch tube. A second strut or leg is disposed opposite the first strut and is not shown in this figure. A cap 430 is shown covering the otherwise open end of the launch tube and is shown restrained by a circumferential strap 431.

FIG. 5 is an exemplary depiction of a launch tube configured as a UAV carrying case embodiment in a partially deployed state. That is, the cap 430 is shown removed, exposing the open end of the launch tube that may have an optional membrane seal 540 as shown. The seal 540 may be a frangible film applied to repel sand, soil, moisture, and/or grit from entering the launch tube during pre-launch preparations. The footing 410 is shown partially rotated away from the launch tube and the first strut or leg 420 is shown partially rotated into a support position.

Figure 6:
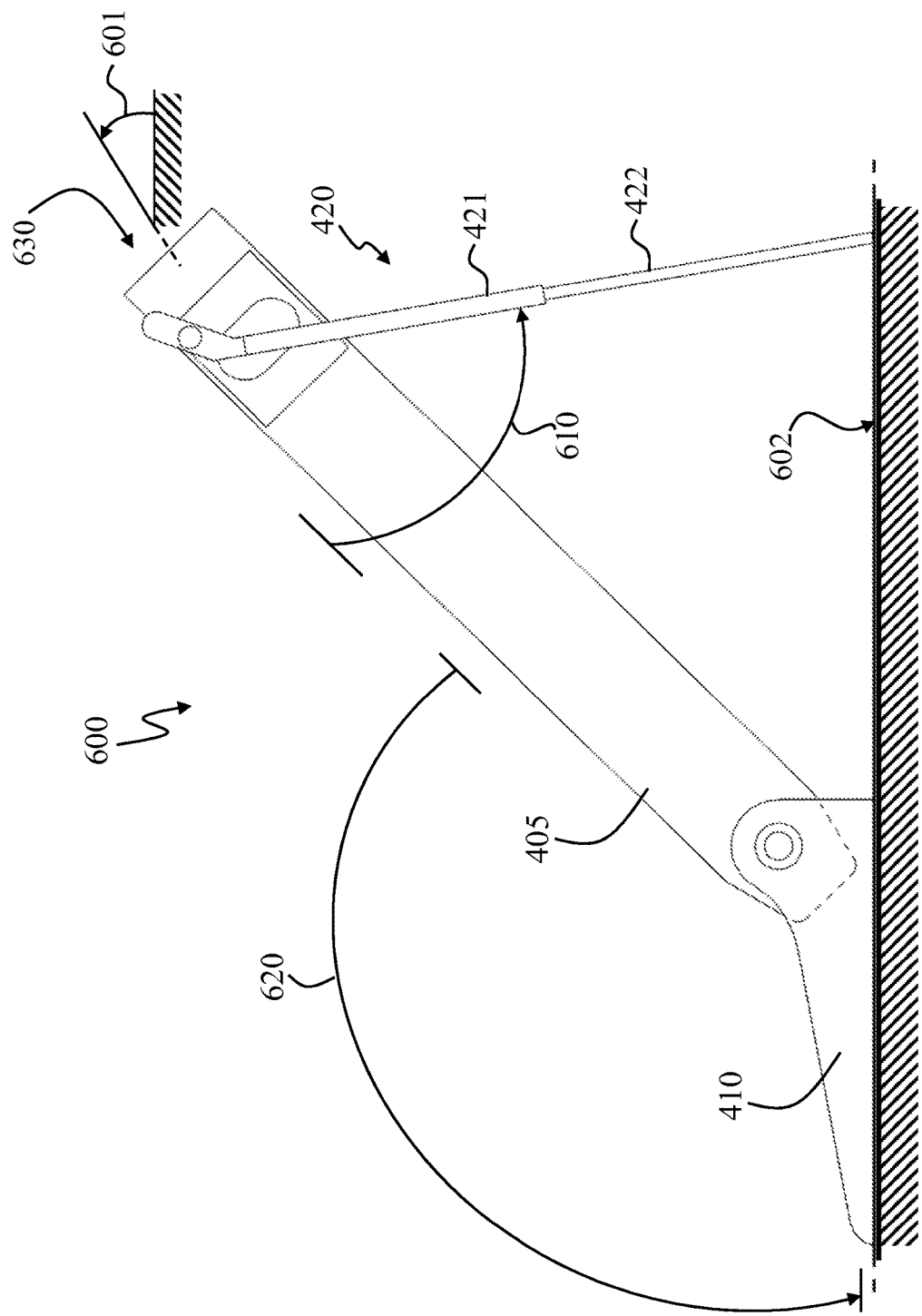
FIG. 6 is an exemplary depiction of a launch tube configured as a UAV carrying case embodiment with support struts and footing deployed.

FIG. 6 is an exemplary depiction of a launch tube 600 configured as a UAV carrying case embodiment with support struts 420 and footing 410 deployed. The use of the term "tube" is done so with the intent to indicate a volume from which a UAV may be launched and not to limit the shape of the volume to a cylindrical tube. The angle 610 of the pair of struts or pair of legs may be adjusted to accommodate a desired launch angle 601 relative to local level 602. Likewise, the angle 620 between the launch tube and the footing may be adjusted to accommodate the desired launch angle 601. In some embodiments, the pair of struts or pair of legs 420 may comprise segments of differing diameters allowing for a telescoping of the distal segment 422 into and out of the proximal segment 421. In these embodiments, the overall length of the legs may be adjusted, either to accommodate uneven local terrain, and to accommodate a desired launch angle 601, or both. The footing 410 may be sized to receive the down force from a boot and/or a mass to further enhance the stiction between the lower surface of the footing and the local ground surface 602. The top of the launch tube 630 may include a frangible membrane to protect the internal launcher volume from grit, sand, moisture and the effects of weather. Once the launcher is positioned on a surface, the launcher 600 may be remotely controlled for purposes of uploading mission information to the UAV while the UAV is in a pre-launch state and for purposes of receiving UAV status information.

Embodiments include an unmanned aerial vehicle (UAV) launch tube that may comprise a tethered sabot configured to engage a UAV within a launcher volume defined by an inner wall, the tethered sabot dimensioned to provide a pressure seal at the inner wall, and tethered to the inner wall. In some embodiments, the tethered sabot may be hollow having an open end oriented toward a high pressure volume and a tether attached within a hollow of the sabot and attached to the inner wall retaining the high pressure volume.

Figure 7:
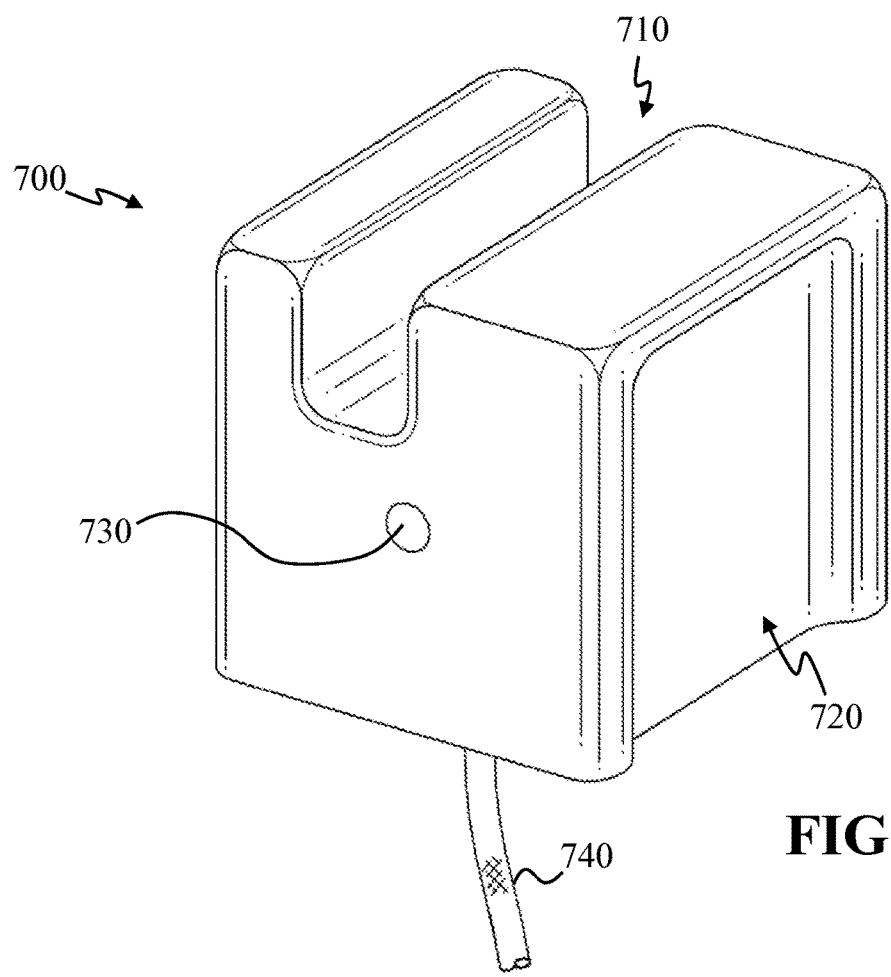
FIG. 7 is a top-side perspective view of an exemplary tethered sabot embodiment of the present invention.

For a launcher having a right parallelepiped aperture, an exemplary tethered sabot 700 embodiment as depicted in FIG. 7 may be used. The sabot may be made of carbon fiber, e.g., a prepreg carbon fiber shaped over a form and cured to yield a hollow article, open at one end. The sabot may have a channel 710 for receiving a pusher propeller assembly of a UAV. The sabot may also have a depression 720 for receiving gas outside of the volume provided by the hollow. The sabot is shown depicting an end portion 730 of a structural element that may span the width of the sabot to provide for a structural attachment for a tether. A portion of a tether 740 is shown extending from the hollow of the sabot.

Figures 8, 9:
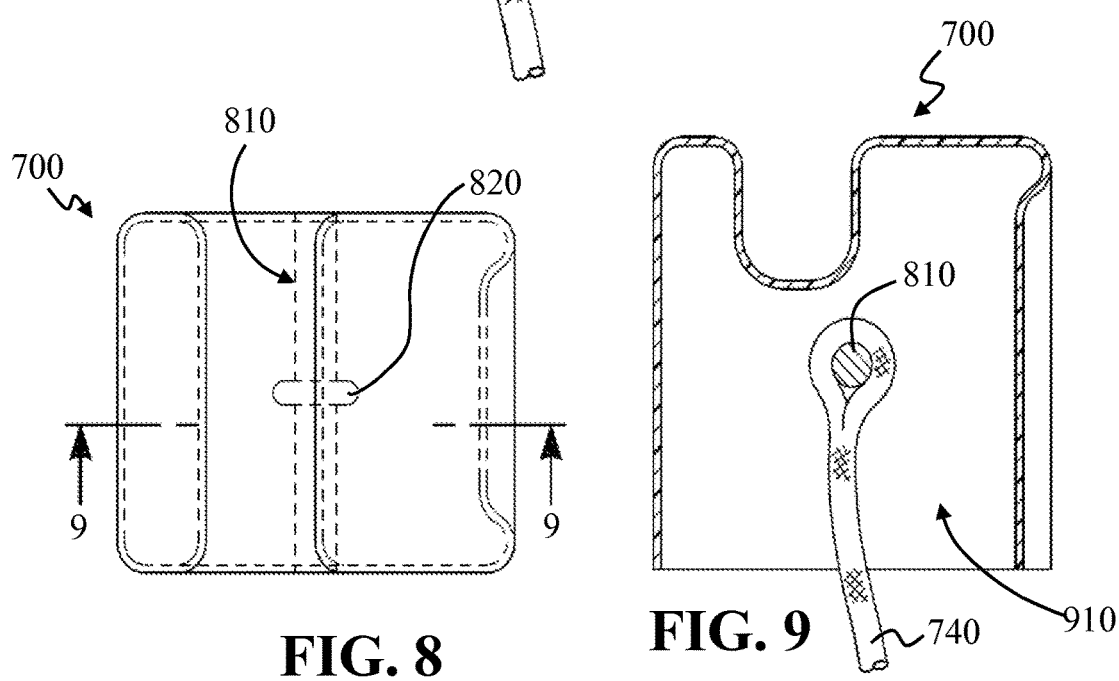
FIG. 8 is a top view of an exemplary tethered sabot embodiment of the present invention.
FIG. 9 is a cross-sectional view of an exemplary tethered sabot embodiment of the present invention.

FIG. 8 is a top view of an exemplary tethered sabot 700 embodiment. The structural element 810 may be a rod, and may span the width of the sabot 700. A loop portion 820 of the tether may engage the structural element 810. The tether 740 may be silicone prepreg, braided Kevlar™ where an end of the tether 740 may be tucked within the braiding of the tether 740 after looping the structural element 810 and further cured.

FIG. 9 is a cross-sectional view of the sabot 700 taken from the top view of FIG. 8 depicting the tether 740 engaging the structural element 810 within the hollow 910 of the sabot 700.

Figures 10A, 10B, 10C:
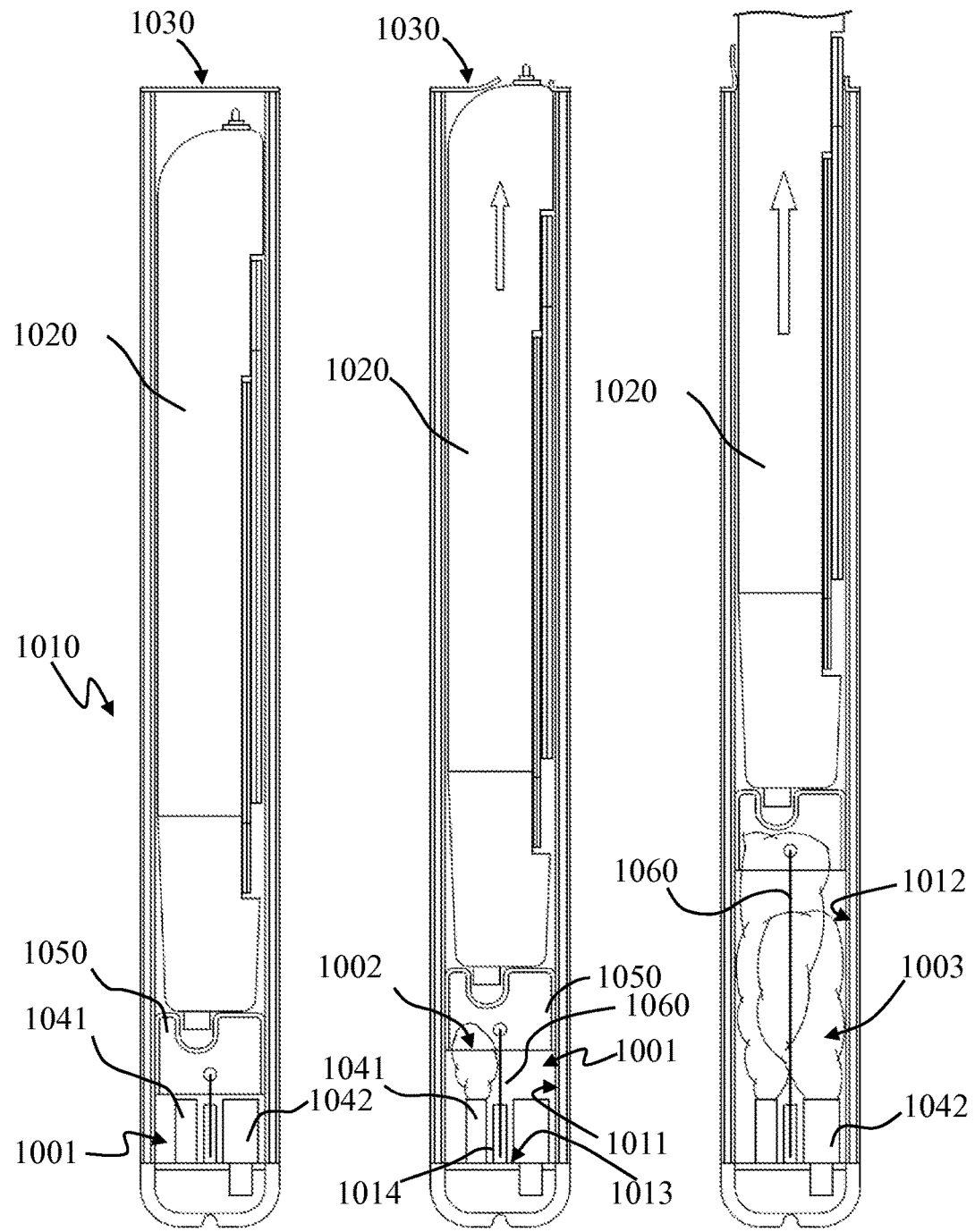
FIGS. 10A-10E depict an exemplary UAV launch using a tethered sabot embodiment of the present invention.

FIG. 10A illustrates a cross-sectional view of a loaded launcher 1010, such as the launcher depicted in FIGS. 1 and 2; loaded with a UAV 1020 such as the UAV depicted in FIG. 3. In this example, the launcher 1010 is shown having an optional frangible seal 1030. Two gas-generating canisters 1041, 1042 are shown disposed within the aft volume 1001 of the launcher 1010. An exemplary tethered sabot 1050 is shown disposed between the gas-generating canisters 1041, 1042 and the UAV 1020.

FIG. 10B illustrates, in the cross-sectional view of FIG. 10A, a first gas-generating canister 1041 increasing the pressure—as depicted by the smoke cloud 1002—within the volume 1001 between the inner aft wall 1011 of the launcher 1010 and the sabot 1050. The tether 1060 may be attached to the inner base wall 1013 via a tether reel or winding element 1014. Relative to FIG. 10A, the sabot 1050 is shown displaced along the launch tube—in this example a right parallelepiped volume—and moving with it the UAV 1020. The UAV is shown breaking the frangible seal 1030 and beginning to exit the launcher 1010.

FIG. 10C illustrates, in the cross-sectional view of FIG. 10A, the second gas-generating canister 1042 increasing, or sustaining, the pressure (as depicted by the second smoke cloud 1003) within the volume between the inner aft wall 1012 of the launcher 1010 and the sabot 1050. The sabot 1050 is shown displaced further along the launch tube, the tether 1060 is shown in a payout length, and, moved with the sabot 1050, the UAV 1020 is shown substantially outside of the launcher.

Figures 10D, 10E:
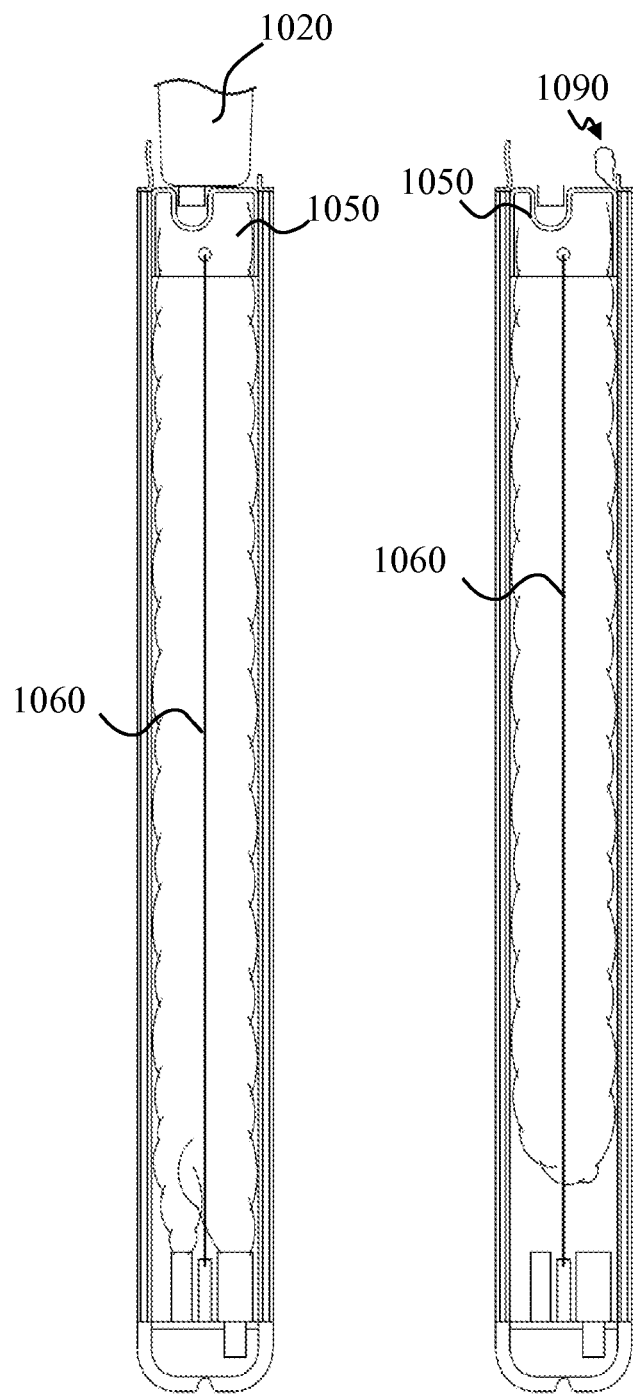

FIG. 10D illustrates, in the cross-sectional view of FIG. 10A, the sabot 1050 fully displaced within the launch tube, constrained from further travel by the tether 1060, and retaining the gas within the launcher volume.

FIG. 10E illustrates, in the cross-sectional view of FIG. 10A, the sabot 1050 fully displaced within the launch tube, constrained from further travel by the tether 1060, and retaining the gas within the launcher volume and allowing the seeping 1090 of gas from the launcher volume into the surrounding atmosphere.

Figures 11A, 11B:
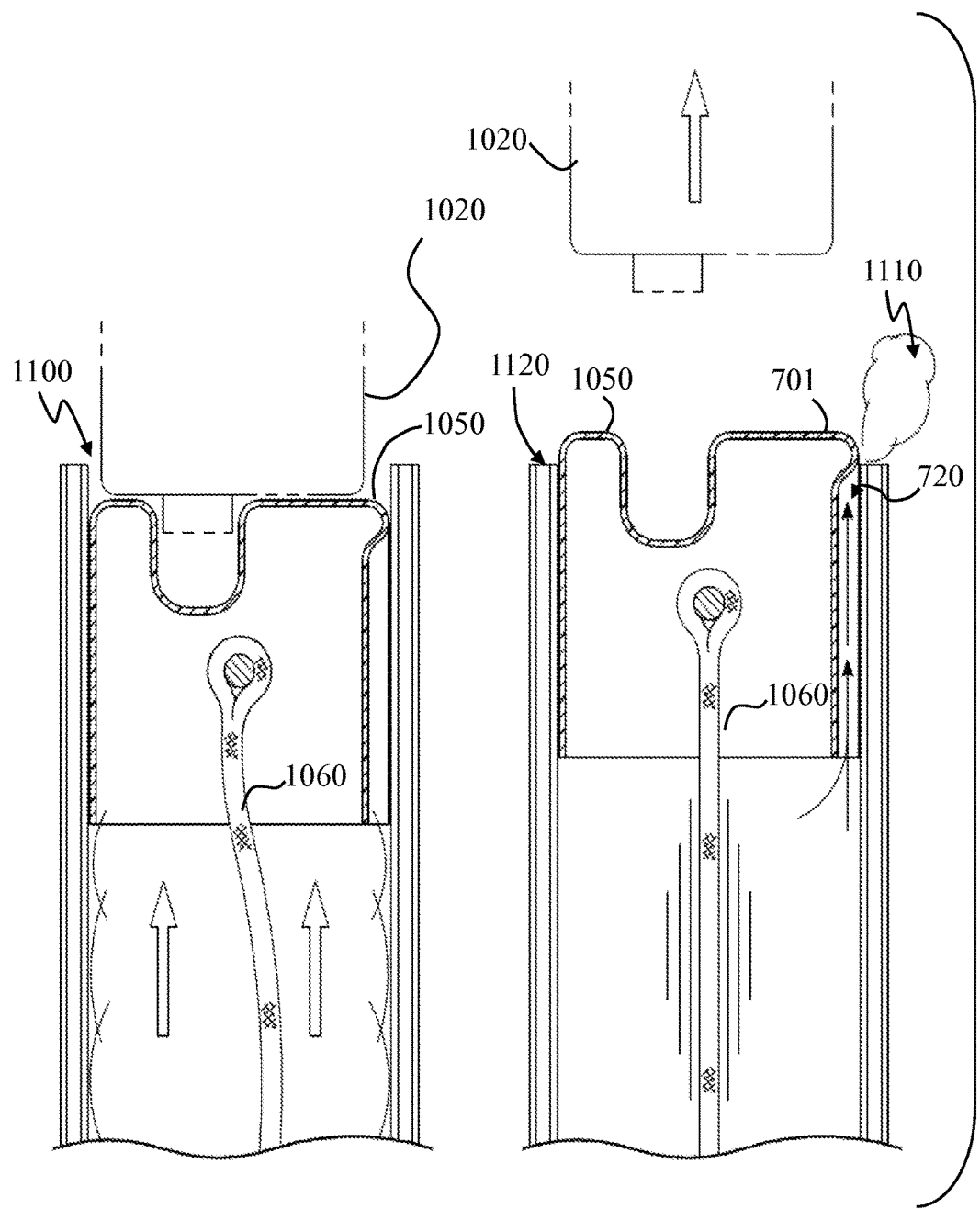
FIGS. 11A-11B depict, in a cross-sectional view of the distal end of a lunch tube, an exemplary UAV launch using a tethered sabot embodiment of the present invention.

FIG. 11A depicts, a cross-sectional view of the distal, an unsealed, end of a lunch tube 1100, as the sabot 1050 approaches full payout as depicted in FIG. 10D. In some embodiments using hot or warm gas generators, the sabot 1050 travels approximately no further than the location depicted in FIG. 11A, and a seepage of gas to atmosphere is around the sabot as the sabot may shrink in a cooling cycle from having been heated by the gas. In some embodiments using warm or cool gas generators, the sabot 1050 may travel to partially extend from the rim 1120 of the launcher (FIG. 11B) where gas may seep 1110 from the side depression 720 once the sabot lip 701 has cleared the launcher rim 1120. By retaining the sabot 1050 via the tether 1060, the launcher retains, for a brief period, a substantial portion of the pressure waves, i.e., the report, and heat produced by rapid gas generation. Post-launch, the launcher diffuses the pressure from the launcher via seepage about the sabot 1050.

In some embodiments, the sabot 1050 may expand out to contact the inner wall or walls of the launcher due to the pressure exerted on the interior of the sabot 1050 by the gas from the gas generators. This expansion can cause, or at least facilitate, the formation of a seal between the sabot 1050 and the inner wall or walls and in doing so prevent or limit the passage of gas around the sabot 1050 during its movement along the tube. In certain embodiments, the sabot may be configured to form gaps between the sabot and the inner wall or inner walls of the launcher. The size of such gaps may be set to provide a desired amount of gas leakage. In some embodiments, the sabot 1050 may be sized to allow enough gas leakage to prevent the launcher from becoming too hot from containing the launch gases such that the structural integrity of the launcher is compromised or breached. Accordingly, sabot 1050 embodiments may be sized to limit gas leakage to limit the sound propagation of the sonic waves generated during the launch process.

Figure 12A:
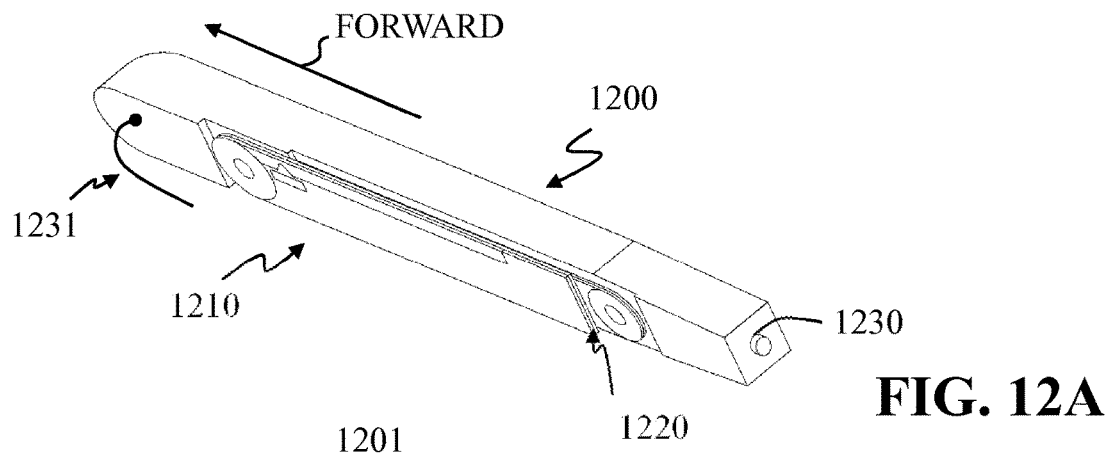
FIG. 12A is a bottom-side perspective view of an exemplary UAV in a pre-launch state.
Figure 12B:
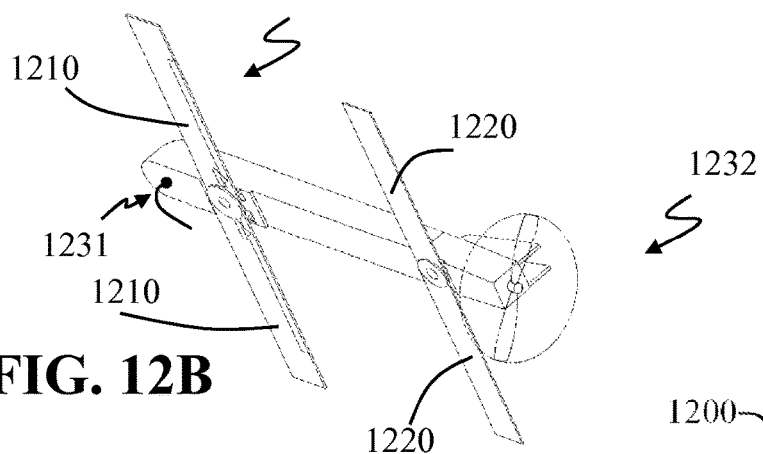
FIG. 12B depicts an exemplary UAV with its airfoils deployed and its pusher propeller rotating.

FIG. 12A depicts, in a bottom-side perspective view, an exemplary UAV in a pre-launch state 1200, i.e., with its wing 1210 and tail surfaces 1220 folded beneath the fuselage of the vehicle. Also shown is a propeller hub 1230 about which a propeller may be rotatably mounted. The air vehicle may include a radio frequency (RF) antenna 1231 conformal with or extending from the vehicle. Whether the tube volume is a right cylinder, a right parallelepiped, or some other shape, the cross-section or cross-sections of the UAV may be insufficient to maintain an air-tight fit between the vehicle and the inner walls of the launcher. Accordingly, for launches based on gas pressure, a sabot may be disposed between the gas source and the UAV. FIG. 12B depicts an exemplary UAV in a launched state 1201 with its airfoils 1210, 1220 deployed and its pusher propeller 1232 rotating.

Figure 13:
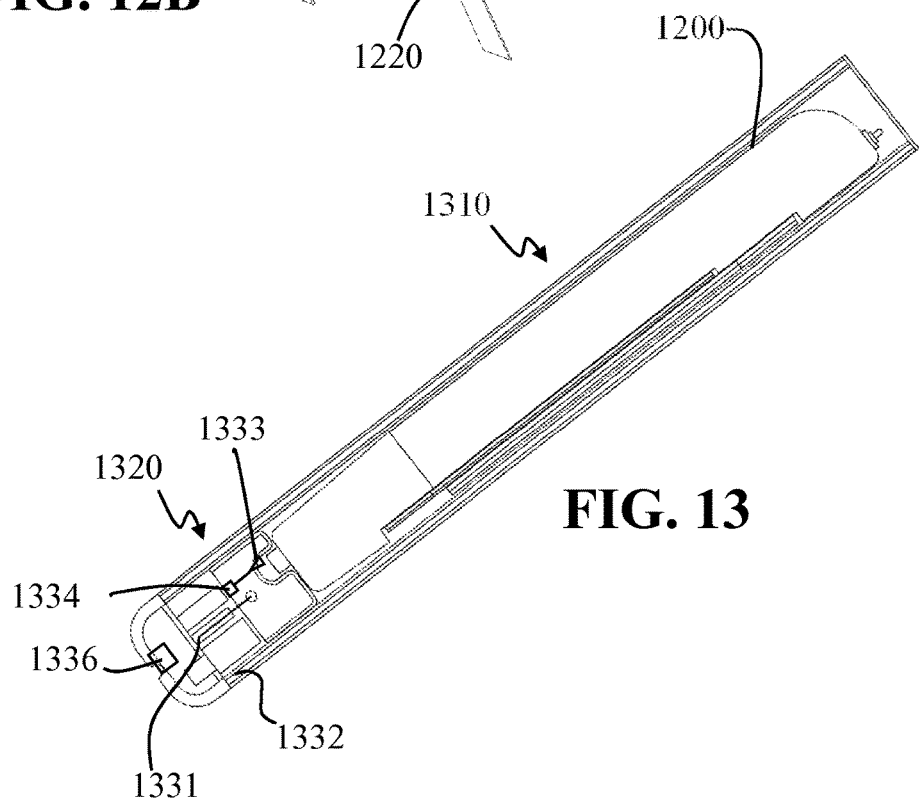
FIG. 13 is a bottom-side perspective view of a portion of an exemplary launch tube embodiment.

FIG. 13 is a side elevational view of the air vehicle 1300 embodiment loaded into a forward portion of a launcher 1310. The aft portion of the launcher 1320 is shown having a pair of gas-generating canisters 1331, 1332 and may include an RF antenna 1333 and receiver unit 1334, and a power source 1336, such as a battery for powering the launcher. In some embodiments the power source 1336 can also power the UAV 1300 while it is in the launcher 1310, allowing for maximum battery life for the UAV's battery after leaving the launcher 1310. Balsawood and epoxy prepreg Kelvar™ are examples of structural elements having high RF permeability. Accordingly, RF antenna and receiver elements of the UAV and/or RF antenna and receiver elements of the launch propulsion unit may receive RF commands from a command node with negligible signal attenuation due to the launcher structure.

Figure 14:
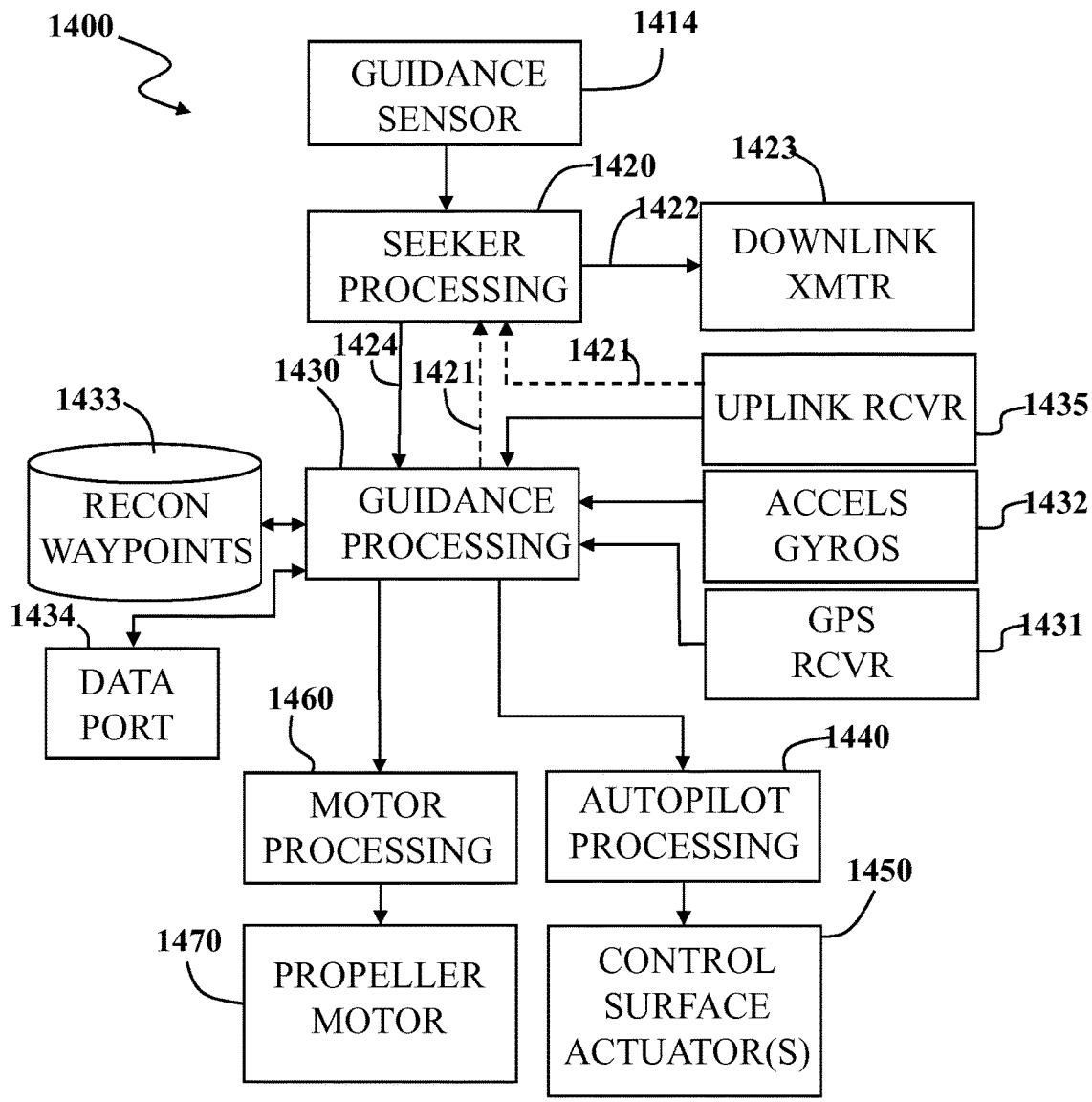
FIG. 14 depicts an exemplary functional block diagram of the UAV processing and guidance and control subsystem.

FIG. 14 depicts an exemplary functional block diagram of the UAV processing and guidance and control subsystem 1400 where the guidance sensor 1414 provides information about the external environment pertaining to seeking processing of a seeker processing 1420. A guidance sensor 1414, and more generally, a guidance sensor suite, may include a passive and/or active radar subsystem, an infrared detection subsystem, an infrared imaging subsystem, a visible light imaging subsystem such as a video camera-based subsystem, an ultraviolet light detection subsystem, and combinations thereof. The seeker processing 1420 may include both image processing and target tracking processing, and target designation or re-designation input 1421 that may be received from an uplink receiver 1435 and/or as an output of a guidance process 1430. The image processing and/or target tracking information 1422 may be transmitted via a downlink transmitter 1423, which may be a part of an uplink/downlink transceiver. The guidance processor 1430, in executing instructions for guidance processing, may take in the target information 1424 from the seeker processing 1420, and UAV flight status information such as position, velocity and attitude from the GPS receiver 1431, and gyroscopes and accelerometers 1432, if any. Once in flight, the guidance processor 1430, to receive reconnaissance waypoints and/or surveillance optimizing trajectories, may reference a memory store 1433. For system embodiments, the guidance process 1430 may receive, by way of an external data port 1434, e.g., during a pre-launch phase, or by way of an uplink receiver 1435, e.g., during a post-launch phase, receive and/or upload reconnaissance waypoints and/or surveillance optimizing trajectories. The guidance processor 1430, as part of executing instructions for determining flight path, a trajectory, or a course steering angle and direction, may reference the waypoint and/or surveillance optimizing trajectory information, particularly when not in a terminal homing mode. The guidance processor 1430 may receive a command via an uplink receiver 1435 to set an initial post-launch mode or flight plan. The uplink receiver 1435 may receive commands, target data, and or flight plan information from a communications node while the UAV is in a pre-launch state.

An example of a terminal homing mode may be proportional navigation with a gravity bias for strike sub-modes of the terminal homing mode, and an acceleration bias for aerial intercept sub-modes of the terminal homing mode. The guidance processing 1430 and autopilot processing 1440 may execute instructions to effect a bank-to-turn guidance, for example, in an elevon embodiment, to redirect the air vehicle by re-orienting its velocity vector. For example, one or more control surfaces may be re-oriented via one or more control surface actuators 1450 causing forces and torques to reorient the air vehicle and the portion of its linear acceleration that is orthogonal to its velocity vector. The portion of the linear acceleration of the air vehicle that is along the velocity vector is greatly affected by aerodynamic drag, and the linear acceleration may be increased via a motor processor 1460 and a propeller motor 1470. For embodiments with full three-axis control, additional control topologies may be implemented including skid-to-turn and other proportion-integral-differential guidance and control processing architectures as well. The seeker processing 1420, guidance processing 1430, motor processing 1460, and/or autopilot processing 1440 may be executed by a single microprocessor having addressable memory and/or the processing may be distributed to two or more microprocessors in distributed communication, e.g., via a data bus.

Figure 15:
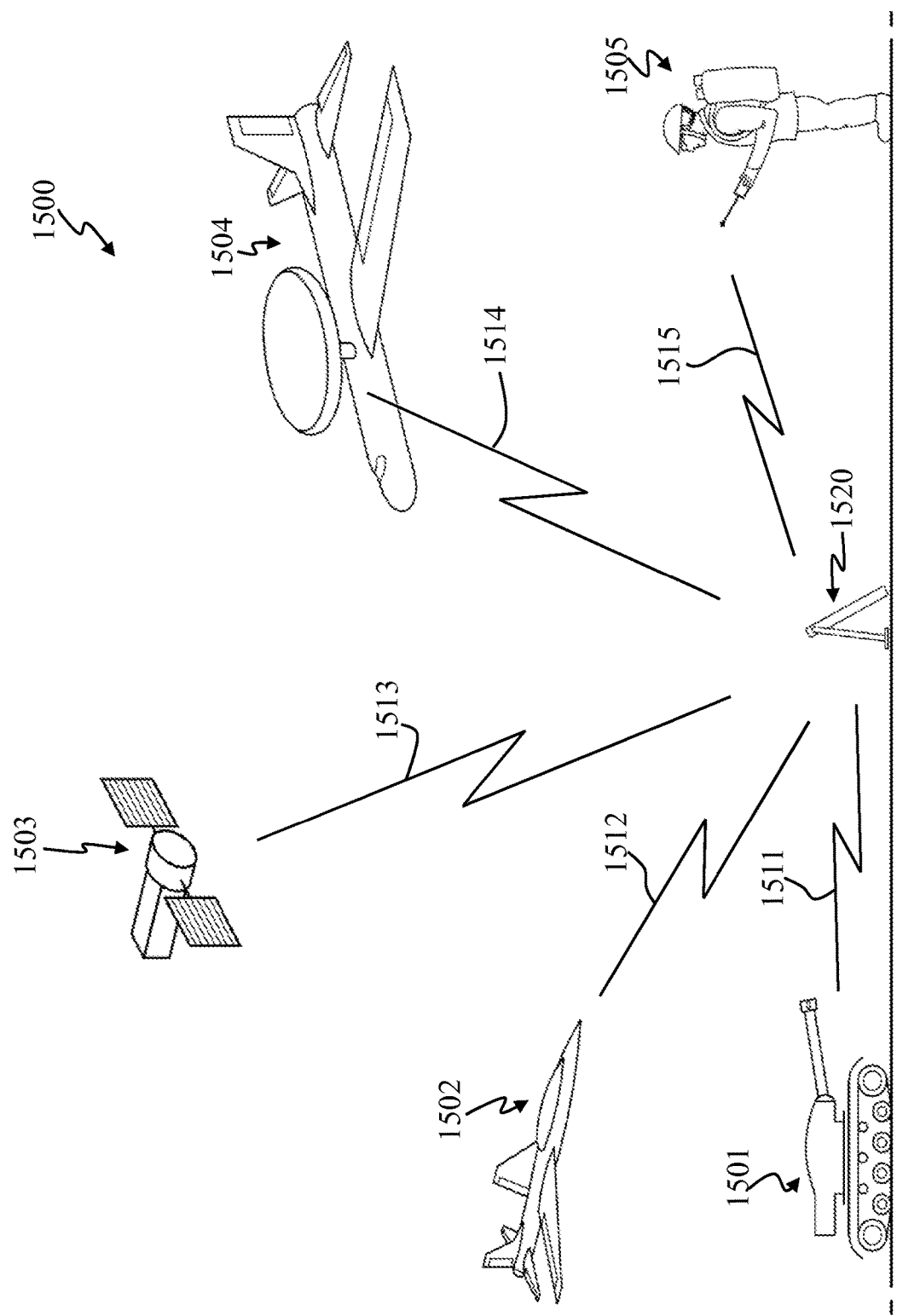
FIG. 15 is a top-level system architecture of a system embodiment.

FIG. 15 is a top-level system architecture of a system 1500 embodiment. Ground vehicles 1501, aircraft 1502, spacecraft 1503, airborne surveillance or airborne communication nodes 1504, or ground, human-portable, communication nodes 1505 may transmit command signals via an RF link 1511-1515 to a launcher 1520 embodiment, that may be, for example, the embodiment depicted in FIG. 13. In some embodiments, the UAV, in a pre-launch state, may output along an RF link 1511-1515 to a requesting node 1501-1505, status information, e.g., battery levels, and the results of self-diagnostics. Launcher embodiments provide for a self-contained RF node via the UAV contained in the launcher. For example, the UAV may be placed in a standby mode, and remain responsive to a received RF signal that may command a full power-up, and thereafter the UAV in the launcher may be ready to be committed to launch—e.g., by an RF command of an offsite command node. The self-contained launcher-UAV may be deployed and left at a prospective launch site for a protracted period of time, and thereafter may be powered up and launched responsive to one or more command signals from an offsite or otherwise remotecommand node.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
    a launcher having a launcher volume defined by a launcher wall, the launcher wall comprising a continuous radio-frequency (RF) permeable material;
    a receiver disposed within the launcher volume, the receiver receiving wireless communication via one or more RF signals received wirelessly through the launcher wall of the launcher, in a pre-launch state.

2. The system of claim 1, the receiver further comprising an RF antenna disposed within the launcher volume.

3. The system of claim 1, further comprising:
    an external communications node;
    wherein the receiver is in communication with the external communications node, in a pre-launch state, to receive wirelessly through the launcher wall of the launcher one or more RF signals from the external communications node.

4. The system of claim 3 wherein the one or more RF signals are selected from the group consisting of: a reconnaissance waypoint information, a surveillance optimizing trajectory information, a target data, and a flight plan information.

5. The system of claim 1, the launcher wall comprising at least one of: a prepreg substrate, a para-aramid synthetic fiber, a poly-paraphenylene terephthalamide, and balsawood.

6. The system of claim 1, further comprising:
    an unmanned aerial vehicle (UAV) disposed within the launcher volume.

7. The system of claim 6, the UAV comprising the receiver.

8. The system of claim 7, the UAV further comprising a transmitter, the transmitter positioned to transmit wirelessly through the launcher wall of the launcher, in a pre-launch state, one or more RF signals.

9. The system of claim 1, further comprising:
    a transmitter disposed within the launcher volume, the transmitter positioned to transmit wirelessly through the launcher wall of the launcher, in a pre-launch state, one or more RF signals.

10. The system of claim 1, further comprising:
    a launch propulsion unit;
    wherein the launch propulsion unit is disposed within the launcher volume, the launch propulsion unit comprising the receiver.

11. The system of claim 1, further comprising:
    one or more gas generating canisters;
    wherein gas generated by the one or more gas generating canisters during a launch of an unmanned aerial vehicle (UAV) disposed within the launcher volume is retained within the launcher volume after the launch of the UAV.

12. The system of claim 1, further comprising:
    a membrane seal disposed over an open end of the launcher.

13. The system of claim 12, wherein the membrane seal is a frangible film preventing outside elements from entering the launcher volume prior to launch.

14. The system of claim 12, further comprising:
    a cap disposed over the membrane seal.

15. An article comprising:
a launcher having a launcher volume defined by a continuous launcher wall, the launcher wall having radio-frequency (RF) permeability;
a receiver disposed within the launcher volume, the receiver receiving wireless communication via one or more RF signals received wirelessly through the launcher wall;
a transmitter disposed within the launcher volume, the transmitter transmitting wireless communication via one or more RF signals transmitted wirelessly through the launcher wall; and
an unmanned aerial vehicle (UAV) disposed within the launcher volume.

16. The article of claim 15, the receiver further comprising an RF antenna disposed within the launcher volume.

17. The article of claim 15, wherein the receiver is in communication with an external communications node, in a pre-launch state, to wirelessly receive one or more RF signals from the external communications node.

18. The article of claim 17, wherein the one or more RF signals are selected from the group consisting of: a reconnaissance waypoint information, a surveillance optimizing trajectory information, a target data, and a flight plan information.

19. The article of claim 15, wherein the transmitter is in communication with an external communications node, in a pre-launch state, to wirelessly transmit one or more RF signals selected from the group consisting of: a status of the UAV and a status of the launcher.

20. The article of claim 15, the launcher further comprising:
a membrane seal disposed over an open end of the launcher preventing outside elements from entering the launcher volume prior to launch.

* * * * *